United States Patent
Kanaoka et al.

(10) Patent No.: US 7,816,053 B2
(45) Date of Patent: Oct. 19, 2010

(54) MEMBRANE-ELECTRODE ASSEMBLY FOR SOLID POLYMER ELECTROLYTE FUEL CELL

(75) Inventors: Nagayuki Kanaoka, Saitama (JP); Masaru Iguchi, Saitama (JP); Hiroshi Sohma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1170 days.

(21) Appl. No.: 11/447,002

(22) Filed: Jun. 6, 2006

(65) Prior Publication Data

US 2006/0280991 A1 Dec. 14, 2006

(30) Foreign Application Priority Data

Jun. 8, 2005 (JP) ............................. 2005-167743

(51) Int. Cl.
*H01M 8/00* (2006.01)
*H01M 8/10* (2006.01)

(52) U.S. Cl. .................. 429/493; 429/491; 429/492

(58) Field of Classification Search .................. 429/33
See application file for complete search history.

(56) References Cited

U.S. PATENT DOCUMENTS

| | | | |
|---|---|---|---|
| 5,403,675 A | | 4/1995 | Ogata et al. |
| 2002/0164513 A1* | | 11/2002 | Asano et al. ................. 429/32 |
| 2004/0126666 A1* | | 7/2004 | Cao et al. ................. 429/313 |

FOREIGN PATENT DOCUMENTS

| | | | |
|---|---|---|---|
| JP | 7-220741 A | | 8/1995 |
| JP | 2001-342241 A | | 12/2001 |
| JP | 2002-293889 A | | 10/2002 |
| JP | 2004-137444 A | | 5/2004 |
| JP | 2004-345997 A | | 12/2004 |
| JP | 2004-346163 A | | 12/2004 |
| JP | 2005-36125 A | | 2/2005 |
| JP | 2005-60625 A | | 3/2005 |

OTHER PUBLICATIONS

Takeshi Kobayashi et al; Preparation of Thermally Stable Proton Conducting Polymer (II); *Polymer Preprints*; Japan; vol. 43 No. 7; pp. 2490-2492; (1993).

Takeshi Kobayashi et al; Preparation of Thermally Stable Proton Conducting Polymer (V); *Polymer Preprints*; Japan; vol. 43;No. 3; pp. 736 (1994).

Takeshi Kobayashi et al; Preparation of Thermally Stable Proton Conducting Polymer, *Polymer Preprints*; Japan; vol. 42; No. 3; pp. 730 (1993).

* cited by examiner

*Primary Examiner*—Dah-Wei D Yuan
*Assistant Examiner*—Steven Scully
(74) *Attorney, Agent, or Firm*—Arent Fox LLP

(57) ABSTRACT

A membrane-electrode assembly having superior hot water resistance has a membrane containing an aromatic polymer having a repeating unit expressed by general formula (1):

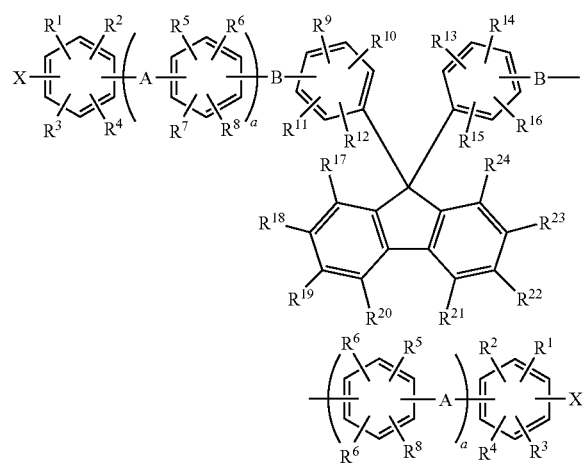

in which A represents independently either —CO— or —SO$_2$—; B represents independently an oxygen atom or sulfur atom; $R^1$ to $R^8$, which may be identical or different from each other, represent a hydrogen atom, fluorine atom, alkyl group, phenyl group or nitrile group; $R^9$ to $R^{24}$, which may be identical or different from each other, represent a hydrogen atom, alkyl group or phenyl group; and 'a' represents an integer of 0 to 4.

4 Claims, No Drawings

MEMBRANE-ELECTRODE ASSEMBLY FOR SOLID POLYMER ELECTROLYTE FUEL CELL

This application is based on and claims the benefit of priority from Japanese Patent Application No. 2005-167743, filed on 8 Jun. 2005, the content of which is incorporated herein by reference.

BACKGROUND OF THE INVENTION

1. Field of the Invention

The present invention relates to membrane-electrode assemblies, which are utilized for solid polymer electrolyte fuel cells, which may provide the fuel cells with higher power generating performance due to superior proton conductivity, and which include solid polymer electrolyte membranes having superior toughness and hot water resistance.

2. Related Art

The solid polymer electrolyte membranes of the membrane-electrode assemblies for fuel cells are generally classified into inorganic and organic types.

The inorganic type is typically exemplified by those containing uranyl phosphate hydrate; however, proton-conductive materials formed of such inorganic compounds typically exhibit poor workability; that is, when electrode layers are being connected, the adhesiveness is often insufficient at the interfaces between the electrode layers and the proton-conductive materials, thus resulting in lower power generating performance due to insufficient proton conductivity at the interfaces.

On the other hand, examples of the organic type include so-called cationic exchange polymers, sulfonated vinyl polymers such as polystyrene sulfonic acid, perfluoroalkyl sulfonic acid polymers such as Nafion (product name, by DuPont), perfluoroalkyl carboxylic acid polymers, and organic polymers of such heat resistant polymers as polybenzimidazoles and polyetheretherketone having sulfonic or phosphoric group introduced therein (see Non-patent Documents 1 to 3 described below).

These organic polymers are typically utilized in the form of a film of a solid polymer electrolyte membrane. In contrast to inorganic materials, the organic polymers may be advantageously processed such that a conductive membrane can be connected onto an electrode because organic polymers are soluble in solvents and are thermoplastic.

Furthermore, Patent Document 1 proposes a solid polymer electrolyte membrane formed of a rigid sulfonated polyphenylene, which is based on a polymer produced by polymerizing an aromatic compound having a phenylene chain and introducing a sulfonic acid group through a reaction with a sulfonating agent.

Non-patent Document 1: Polymer Preprints, Japan, Vol. 42, No. 7, pp. 2490-2492 (1993) Non-patent Document 2: Polymer Preprints, Japan, Vol. 43, No. 3, pp. 736 (1994) Non-patent Document 3: Polymer Preprints, Japan, Vol. 42, No. 3, pp. 730 (1993)

Patent Document 1: U.S. Pat. No. 5,403,675

However, most of these organic polymers suffer from such problems as insufficient proton conductivity, insufficient durability, decrease of proton conductivity at higher temperatures, e.g., no less than 100 degrees C., significant decrease of mechanical properties, e.g., elastic modulus in particular, significant fluctuation of proton conductivity under various humidity conditions, unsatisfactory adhesion with electrodes, and decrease of strength or disintegration of assemblies induced from excessive swelling due to hydroscopic polymer structures. As such, there still exist a variety of problems in the organic polymers, described in the Non-patent Documents for example, for applying to solid polymer electrolyte membranes.

In addition, the organic polymers described in Patent Document 1 described above may provide higher proton conductivity when the additional amount of sulfonic acid group is increased; however, there simultaneously arise problems in that mechanical properties of sulfonated polymers, for example, breaking elongation, folding resistance and toughness, and also hot water resistance, are remarkably impaired.

Accordingly, an object of the present invention is to provide membrane-electrode assemblies (hereinafter referred to sometimes as "MEA") for solid polymer electrolyte fuel cells that may display superior proton-conductive power generating performance and also exhibit excellent toughness and hot water resistance.

SUMMARY OF THE INVENTION

As a result of vigorous efforts to achieve the objects, we have found that MEAs with superior hot water resistance may be prepared by an aromatic unit having a fluorene skeleton being employed as the polymer that constitutes the solid polymer electrolyte membrane, and also a polymer unit, containing a sulfonic acid group and forming a phenylene bond, being combined with the polymer depending on the requirements. Specifically, the present invention provides membrane-electrode assemblies for solid polymer electrolyte fuel cells as follows.

According to a first aspect of the present invention, a membrane-electrode assembly for solid polymer electrolyte fuel cells, includes: an anode electrode, a cathode electrode, and a solid polymer electrolyte membrane; the anode electrode disposed on one side of the solid polymer electrolyte membrane, andthe cathode electrode disposed on the other side of the solid polymer electrolyte membrane, wherein the solid polymer electrolyte membrane contains an aromatic polymer having a repeating unit expressed by the general formula (1) shown below:

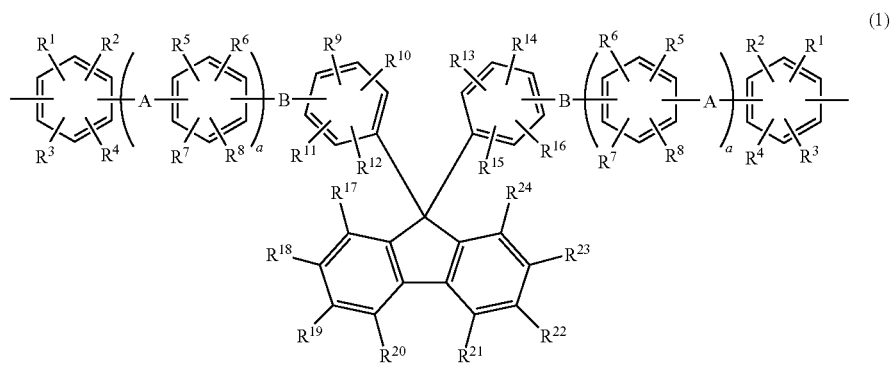

in which A represents independently either —CO— or —SO$_2$—; B represents independently an oxygen atom or sulfur atom; R$^1$ to R$^8$, which may be identical or different from each other, represent a hydrogen atom, fluorine atom, alkyl group, phenyl group or nitrile group; R$^9$ to R$^{29}$, which may be identical or different from each other, represent a hydrogen atom, alkyl group or phenyl group; and 'a' represents an integer of 0 to 4.

According to a second aspect of the present invention, a membrane-electrode assembly for solid polymer electrolyte fuel cell, further includes the repeating unit expressed by the general formula (2) shown below:

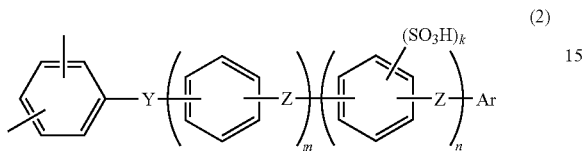

(2)

in which Y represents at least a structure selected from the group consisting of —CO—, —SO$_2$—, —SO—, —CONH—, —COO—, —(CF$_2$)$_l$—('l' is an integer of 1 to 10) and —C(CF3)$_2$—; Z represents a direct bond or at least a structure selected from the group consisting of —(CH$_2$)$_l$—('l' is an integer of 1 to 10), —C(CH$_3$)$_2$—, —O— and —S—; Ar represents an aromatic group having a substituent expressed by —SO$_3$H, —O(CH$_2$)$_p$SO$_3$H or —O(CF$_2$)$_p$SO$_3$H; p is an integer of 1 to 12, m is an integer of 0 to 10, n is an integer of 0 to 10, and k is an integer of 1 to 4.

According to a third aspect of the present invention, in a membrane-electrode assembly for solid polymer electrolyte fuel cells, the general formula (1) is the general formula (1a) shown below:

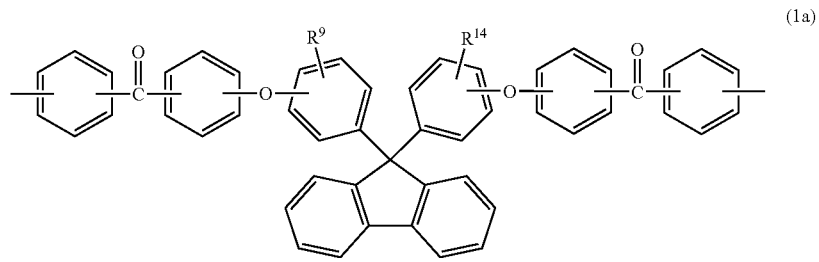

(1a)

in which R$^9$ and R$^{14}$, which may be identical or different from each other, represent a hydrogen atom, alkyl group, or phenyl group.

In accordance with the present invention, there are provided polymers with an aromatic unit having a fluorene skeleton, and copolymers with a polymer unit having a sulfonic group as appropriate and forming a phenylene bond. Such polymers and copolymers may exhibit higher hot water resistance, higher proton conductivity, and superior mechanical properties, thus MEAs may be provided with superior power generating performance.

DETAILED DESCRIPTION OF THE INVENTION

The MEAs according to the present invention will be explained more specifically below.

Aromatic Polymer

Solid polymer electrolyte membranes, employed in the MEAs of the present invention, contain an aromatic polymer having a repeating unit expressed by the general formula (1) shown below.

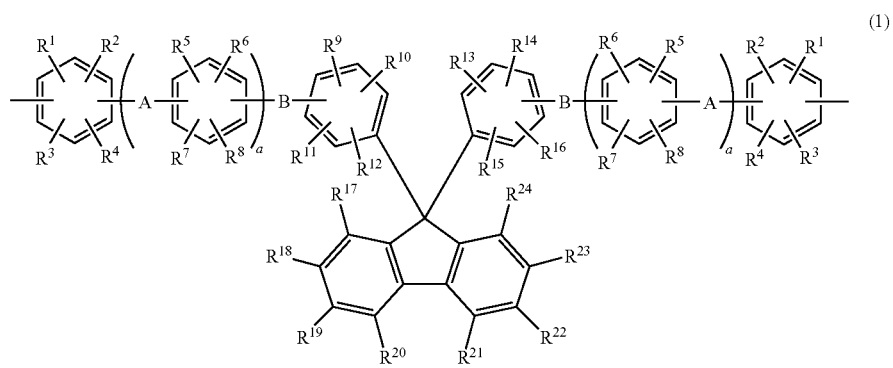

(1)

in which A represents independently either —CO— or —SO$_2$—; B represents independently an oxygen atom or sulfur atom; $R^1$ to $R^8$, which may be identical or different from each other, represent a hydrogen atom, fluorine atom, alkyl group, phenyl group or nitrile group; $R^9$ to $R^{24}$, which may be identical or different from each other, represent a hydrogen atom, alkyl group or phenyl group; and 'a' represents an integer of 0 to 4.

The aromatic polymers, expressed by the general formula (1), may provide the polymer or copolymer with hydrophobic property due to the repeating unit in the polymer unit. In addition, an effect to enhance the toughness of the polymer and other mechanical strength may be derived due to the flexible structure of the repeating unit itself. Furthermore, superior hot water resistance may be exhibited in the case of the copolymers, due to the higher hydrophobicity even when a larger number of sulfonic acid groups are introduced into other units.

In particular, the aromatic polymers expressed by the formula (1a) shown below may be preferably employed since they afford higher toughness and other mechanical strengths to solid polymer electrolyte membranes.

in which A represents independently either —CO— or —SO$_2$—, preferably A is —CO—; B represents independently an oxygen atom or sulfur atom; X represents an atom or group selected from halogen atoms other than fluorine, i.e., chlorine, bromine or iodine atom, —OSO$_2$CH$_3$ or —OSO$_2$CF$_3$; 'a' represents an integer of 0 or 1 to 4.

$R^1$ to $R^8$, which may be identical or different from each other, represent a hydrogen atom, fluorine atom, alkyl group, phenyl group or nitrile group; $R^9$ to $R^{24}$, which may be identical or different from each other, represent a hydrogen atom, alkyl group or phenyl group; 'a' represents an integer of 0 to 4. Examples of the alkyl groups include methyl, ethyl, propyl, butyl, amyl or hexyl group.

In particular, the aromatic compounds expressed by the formula (1a') shown below may be preferably employed since they afford the polymer with higher toughness and other mechanical strengths when solid polymer electrolyte membranes are prepared therefrom.

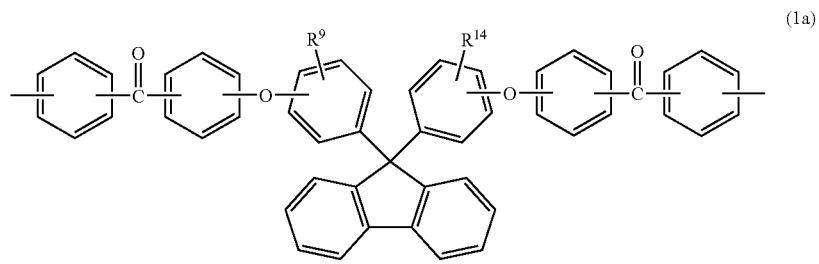

(1a)

in which $R^9$ and $R^{14}$, which may be identical or different from each other, represent a hydrogen atom, alkyl group, or phenyl group.

Monomer Component The aromatic compounds, which correspond to a monomer making in the aromatic polymers expressed by the general formula (1), may be those expressed by the general formula (1') shown below.

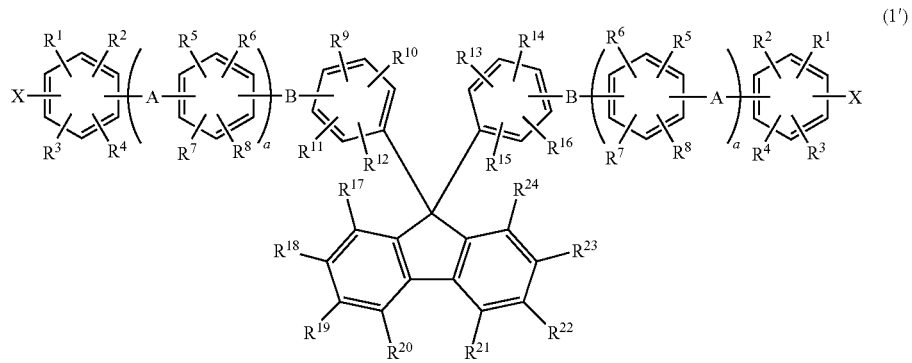

(1')

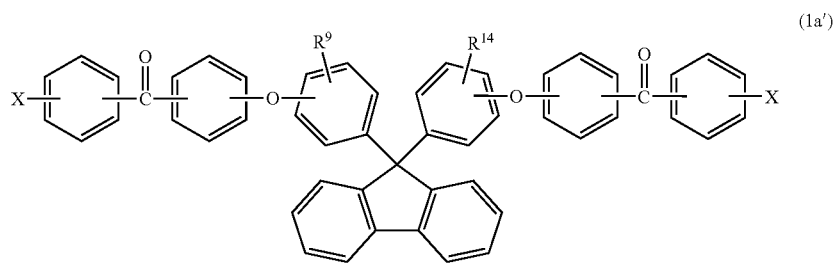

(1a′)

in the formula shown above, X represents an atom or group selected from halogen atoms other than fluorine, —OSO$_2$CH$_3$ or —OSO$_2$CF$_3$; R$^9$ and R$^{14}$, which may be identical or different from each other, represent a hydrogen atom, alkyl group or phenyl group.

Specific examples of aromatic compounds expressed by the formula (1′) shown above include the compounds shown below:

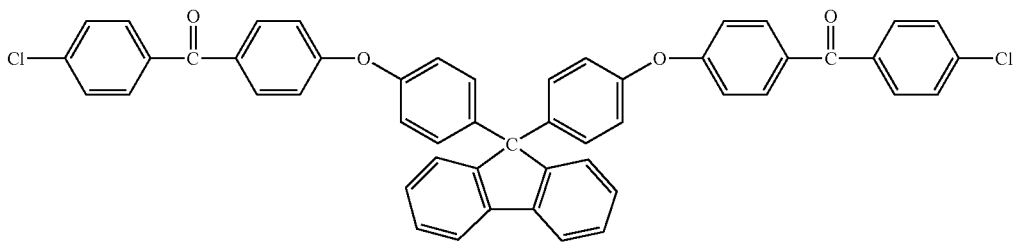

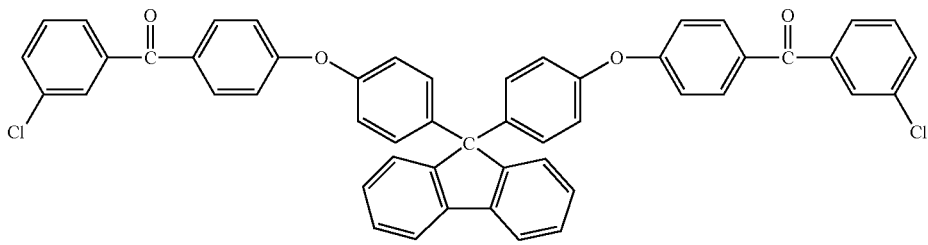

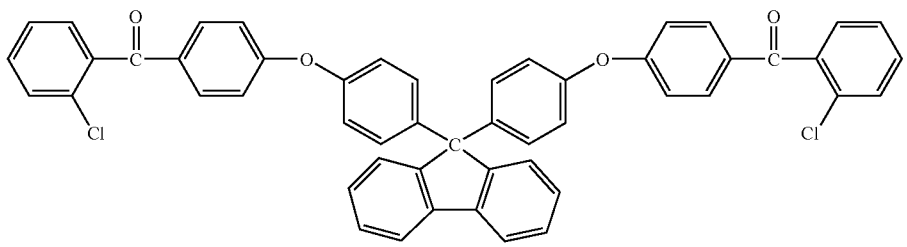

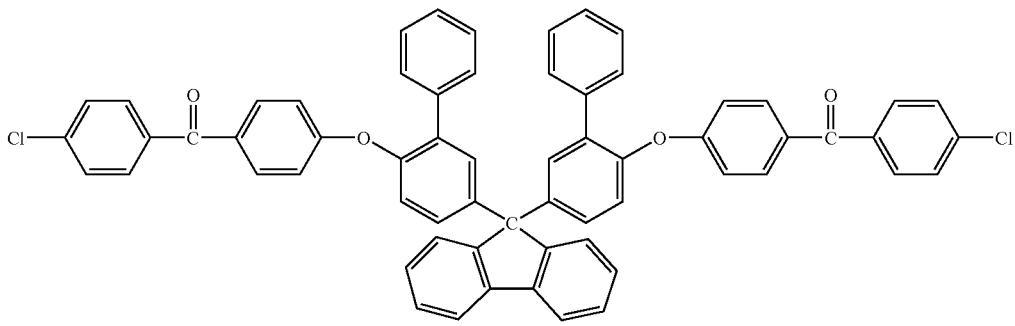

-continued
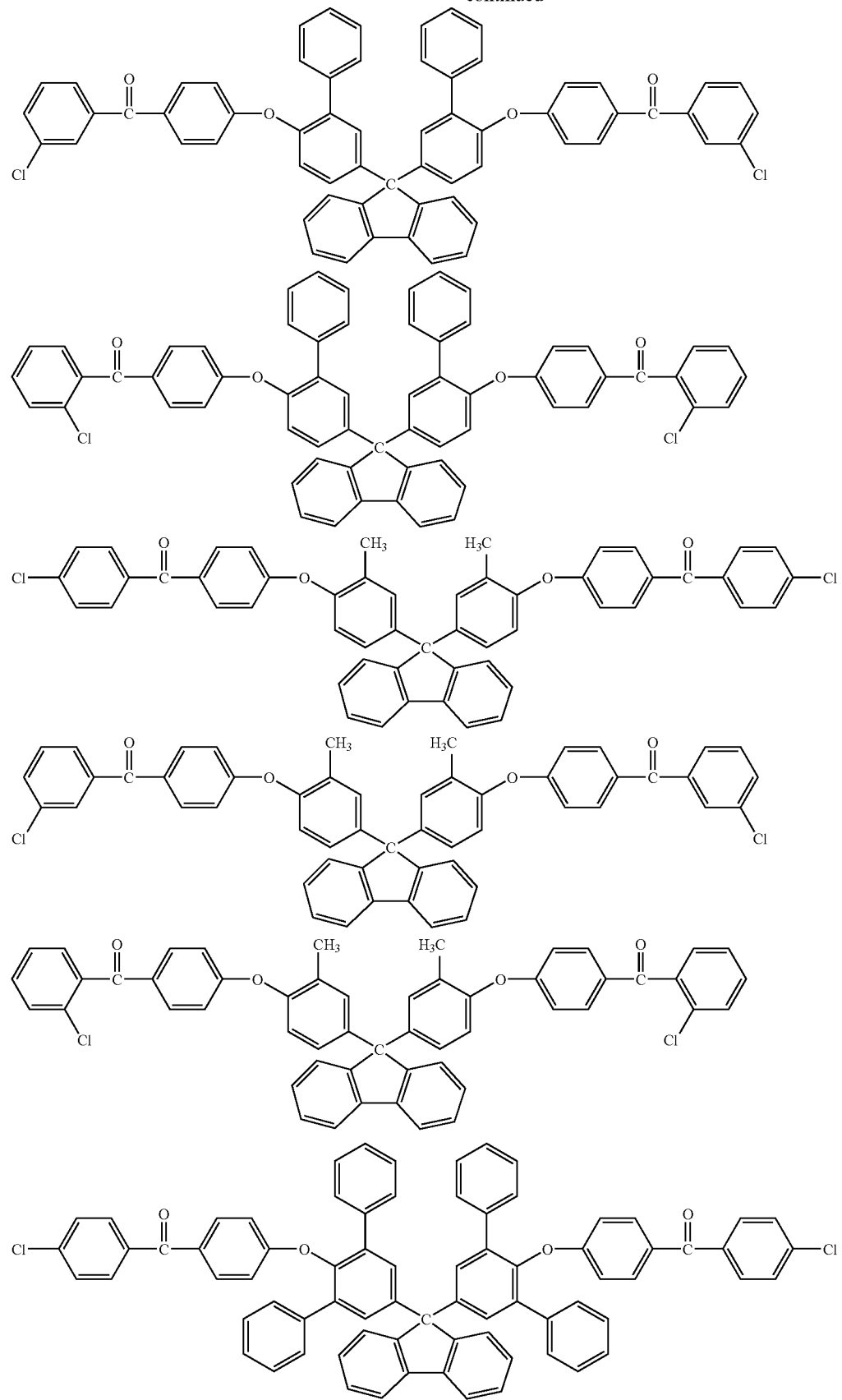

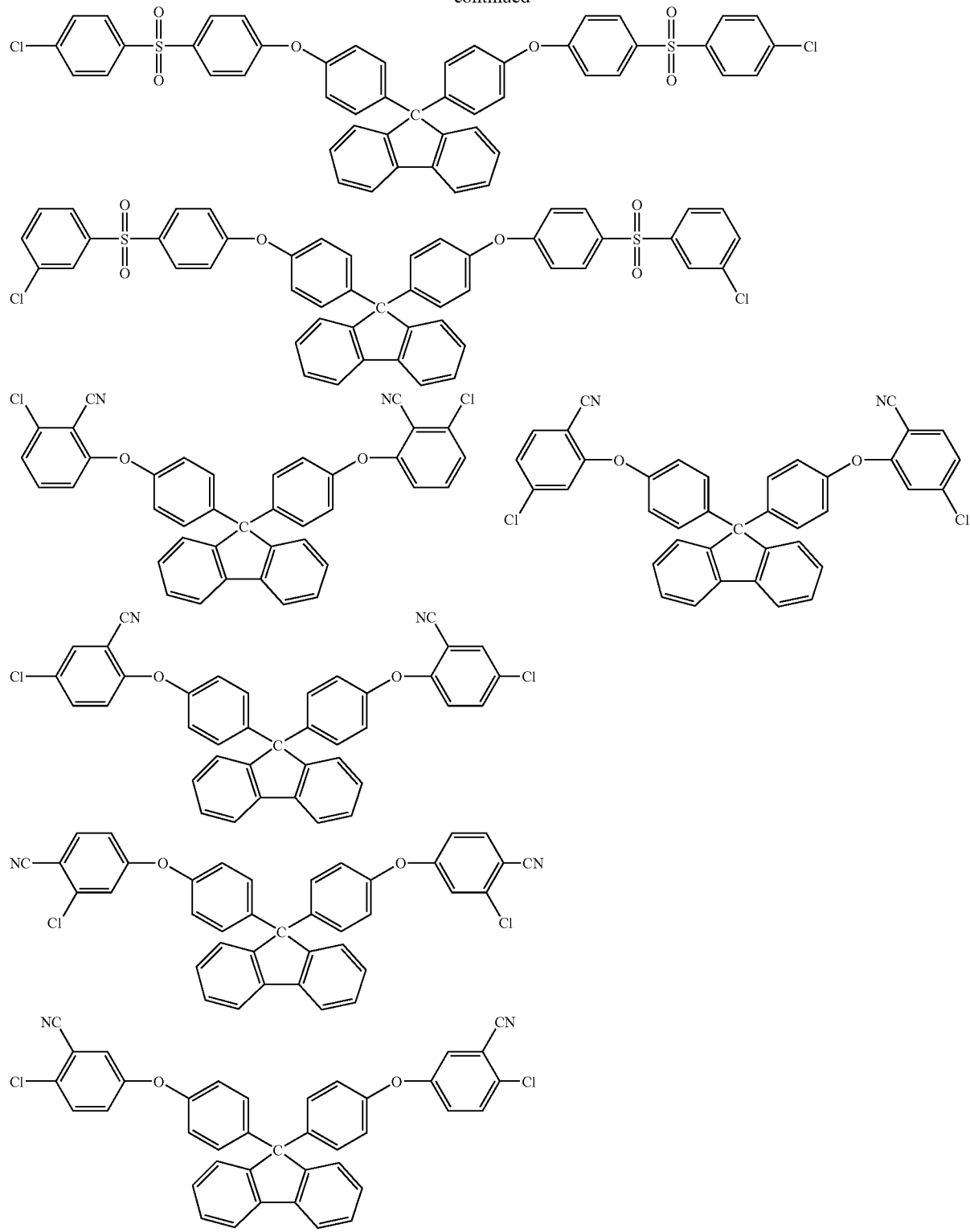

-continued

The compounds expressed by the formula (1') shown above may be synthesized via the following reaction.

An alkaline metal such as lithium, sodium or potassium, hydrogenated alkaline metal, alkaline metal carbonate or the like is firstly added to bisphenol compound with a fluorene skeleton in a polar solvent such as N-methyl-2-pyrrolidone, N,N-dimethyl acetamide, sulfolane, diphenyl sulfone and dimethyl sulfoxide thereby to prepare the corresponding alkaline metal salt of the bisphenol compound. The amount of the alkaline metals is typically more than the amount of the phenol group, such that the equivalent of alkaline metals is 1.1 to 2, preferably 1.2 to 1.5 times of the equivalent of the hydroxyl group of phenol compounds. Preferably, a solvent azeotropic with water such as benzene, toluene, xylene, chlorobenzene and anisole is also added to the reaction mixture to promote the reaction.

Examples of the bisphenol compound with a fluorene skeleton include 9,9-bis(4-hydroxyphenyl)fluorene, 9,9-bis(4-hydroxy-3-methylphenyl)fluorene, 9,9-bis(4-hydroxy-3-phenylphenyl)fluorene, 9,9-bis(4-hydroxy-2-methylphenyl) fluorene, 9,9-bis(4-hydroxy-2-phenylphenyl)fluorene, 9,9-bis(4-hydroxy-2,5-dimethylphenyl)fluorene, 9,9-bis(4-hydroxy-3,5-dimethylphenyl)fluorene, 9,9-bis(4-hydroxy-3,5-diphenylphenyl)fluorene, 9,9-bis(4-hydroxy-3-fluorophenyl)fluorene, 9,9-bis(4-hydroxy-3-cyclohexylphenyl)fluorene, 9,9-bis(4-hydroxy-3-ethylphenyl)fluorene, 9,9-bis(4-hydroxy-3-propylphenyl) fluorene, 9,9-bis(4-hydroxy-3-isopropylphenyl)fluorene, 9,9-bis(4-hydroxy-3-butylphenyl)fluorene, 9,9-bis(4-hydroxy-3-t-butylphenyl)fluorene, 9,9-bis(4-hydroxy-3-isobutylphenyl)fluorene and the like.

Then, alkaline metal salts of the bisphenol compounds and certain dihalogenated aromatic compounds are allowed to react with each other. In the reaction, an alkaline metal and a halogen may form a salt, thereby separating from the original compounds, and a bisphenol ring and a dihalogenated aromatic compound make a bond through —O—. When a bisthiophenol is employed to react in place of the bisphenol compound, a bisthiophenol ring and a dihalogenated aromatic compound make a bond through —S—.

Examples of the dihalogenated aromatic compounds employed in the reaction described above include sulfons such as bis(4-chlorophenyl)sulfone, bis(3-chlorophenyl)sulfone, bis(2-chlorophenyl)sulfone, 3-chlorophenyl-4-chlorophenylsulfone, 2-chlorophenyl-4-chlorophenylsulfone, 4-chlorophenyl-4-fluorophenylsulfone, 2-chlorophenyl-4-fluorophenylsulfone, 3-chlorophenyl-4-fluorophenylsulfone, 4-chlorophenyl-2-fluorophenylsulfone, 4-chlorophenyl-3-fluorophenylsulfone, 1,4-bis(4-chlorosulfonyl)benzene, 1,3-bis(4-chlorosulfonyl) benzene and 1,2-bis(4-chlorosulfonyl) benzene.

Also benzophenones may be exemplified such as 4,4'-dichlorobenzophenone, 3,3'-dichlorobenzophenone, 2,2'-dichlorobenzophenone, 3,4'-dichlorobenzophenone, 2,4'-dichlorobenzophenone, 4-chloro-4'-fluorobenzophenone, 2-chloro-4'-fluorobenzophenone, 3-chloro-4'-fluorobenzophenone, 4-chloro-2'-fluorobenzophenone, 4-chloro-3'-fluorobenzophenone, 1,4-bis(4-chlorobenzoyl)benzene, 1,3-bis(4-chlorobenzoyl)benzene, 1,2-bis(4-chlorobenzoyl) benzene, 1,4-bis(3-chlorobenzoyl)benzene, 1,3-bis(3-chlorobenzoyl)benzene, 1,2-bis(3-chlorobenzoyl)benzene, 1,4-bis(2-chlorobenzoyl)benzene, 1,3-bis(2-chlorobenzoyl) benzene, 1,2-bis(2-chlorobenzoyl)benzene, 1,4-bis(4-chlorobenzoyl)-2,3,5,6-tetrafluorobenzene and 1,3-bis(4-chlorobenzoyl)-2,4,5,6-tetrafluorobenzene.

Furthermore, benzonitriles may be exemplified such as 2,6-dichlorobenzonitrile, 2,5-dichlorobenzonitrile, 2,4-dichlorobenzonitrile, 2-chloro-6-fluorobenzonitrile, 2-chloro-5-fluorobenzonitrile, 2-chloro-4-fluorobenzonitrile, 4-chloro-2-fluorobenzonitrile and 5-chloro-2-fluorobenzonitrile.

Among these compounds, 4,4'-dichlorobenzophenone, 3,4'-dichlorobenzophenone, 2,4'-dichlorobenzophenone, 4-chloro-4'-fluorobenzophenone, 2-chloro-4'-fluorobenzophenone, 4-chloro-2'-fluorobenzophenone, 2,6-dichlorobenzonitrile, 2,5-dichlorobenzonitrile and 2,4-dichlorobenzonitrile are preferable.

The dihalogenated aromatic compounds are introduced into the reaction in an amount so that the molar quantity of the dihalogenated aromatic compound is two times or more than that of the bisphenol compound, preferably, 2.1 to 5 times of the bisphenol compound. The molar quantity of two times or more may bring about the aromatic compounds expressed by the general formula (1).

The reaction is carried out at a temperature of 60 to 300 degrees C., preferably 80 to 250 degrees C., for a period of 15 minutes to 100 hours, preferably, 1 hour to 24 hours.

When compounds having a chloro group and fluoro group are employed as the dihalogenated aromatic compound, the reaction conditions such as the ratio of starting compounds, reaction temperature and reaction period are arranged such that the fluoro group can solely react with the bisphenol compound.

The resulting reaction may be purified by means of reprecipitation, recrystallization and the like.

The reaction occurrences as well as the resulting aromatic compounds may be identified by means of well-known methods such as NMR, IR and the like.

The reaction occurrence can be identified from IR spectra by the fact that the absorption peaks at around 3650 to 3584 $cm^{-1}$ of phenolic hydroxide group disappear and the absorption peaks at around 1275 to 1200 $cm^{-1}$ and 1075 to 1020 $cm^{-1}$ of ether linkage become notable. From NMR spectra, the reaction occurrence can be confirmed when the signal is distinguished at around 9 to 11 ppm which is derived from hydrogen atoms of the phenolic hydroxide groups.

Aromatic Copolymer

The polyarylene polymers in the present invention may be a homopolymer constituted solely from the repeating unit expressed by the general formula (1) shown below which may be derived from formula (1'), or may be a copolymer constituted from the repeating unit of the general formula (1) and other repeating units.

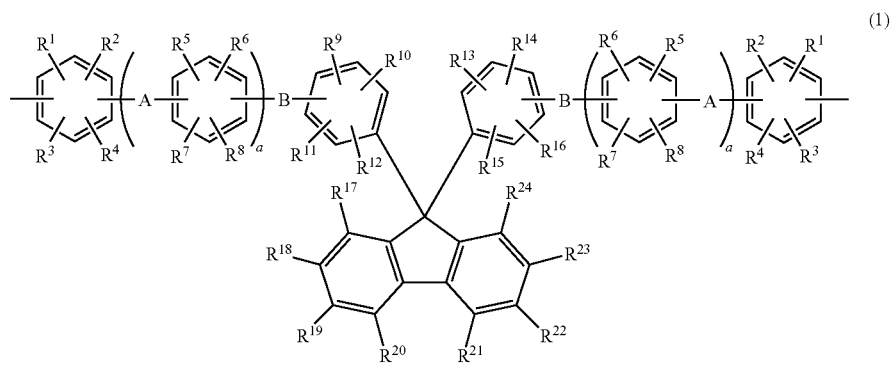

(1)

in which A represents independently either —CO— or —SO$_2$—; B represents independently an oxygen atom or sulfur atom; R$^1$ to R$^8$, which may be identical or different from each other, represent a hydrogen atom, fluorine atom, alkyl group, phenyl group or nitrile group; R$^9$ to R$^{24}$, which may be identical or different from each other, represent a hydrogen atom, alkyl group or phenyl group; and 'a' represents an integer of 0 to 4.

The repeating units other than the repeating units of aromatic polymers expressed by the formula (1) may be those expressed by the general formula (2) shown below. The polymers with these repeating units may display higher proton conductivity, thus may be preferably utilized for solid polymer electrolyte membranes.

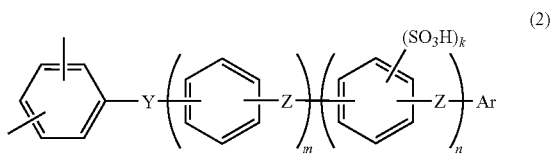

(2)

In the general formula (2), Y represents at least a structure selected from the group consisting of —CO—, —SO$_2$—, —SO—, —CONH—, —COO—, —(CF$_2$)$_1$—('1' is an integer of 1 to 10) and —C(CF$_3$)$_2$—. Among these, —CO— and —SO$_2$— are preferred.

Z represents a direct bond or at least a structure selected from the group consisting of —(CH$_2$)$_1$—('1' is an integer of 1 to 10), —C(CH$_3$)$_2$—, —O— and —S—. Among these, the direct bond and —O— are preferred.

Ar represents an aromatic group having a substituent expressed by —SO$_3$H, —O(CH$_2$)$_p$SO$_3$H or —O(CF$_2$)$_p$SO$_3$H (p is an integer of 1 to 12).

Specific examples of the aromatic groups include phenyl, naphthyl, anthryl, and phenanthryl groups. Among these groups, phenyl and naphthyl groups are preferred. At least a substituent expressed by —SO$_3$H, —O(CH$_2$)$_p$SO3H or —O(CF$_2$)$_p$SO$_3$H (p is an integer of 1 to 12) in the aromatic group should be substituted; preferably, at least two substituents in the aromatic group should be substituted in the case in which the aromatic group is a naphthyl group.

The 'm' is an integer of 0 to 10, preferably 0 to 2; 'n' is an integer of 0 to 10, preferably 0 to 2; and 'k' is an integer of 1 to 4.

The preferable combinations of integers 'm' and 'n', structures of Y, Z and Ar are as follows:

(i) m=0, n=0; Y is —CO—, Ar is a phenyl group with a substituent of —SO$_3$H (ii) m=1, n=0; Y is —CO—, Z is —O—, and Ar is a phenyl group with a substituent of —SO$_3$H (iii) m=1, n=1, k=1; Y is —CO—, Z is —O—, and Ar is a phenyl group with a substituent of —SO$_3$H (iv) m=1, n=0; Y is —CO—, and Ar is a naphthyl group with two substituents of —SO$_3$H (v) m=1, n=0; Y is —CO—, Z is —O—, and Ar is a phenyl group with a substituent of —O(CH$_2$)$_4$SO$_3$H In order to enhance the proton conductivity, the amount of —SO$_3$H is increased within the repeating unit in formula (2), or the percentage of the repeating unit is increased within the formula (2).

Method for Producing Aromatic Copolymer

There exist three methods, A, B and C, shown below in order to produce polyarylenes, having a sulfonic acid group, which are constituted from the repeating units of the general formula (1) or (2).

Method A

A monomer, having a sulphonic ester group, capable of constituting the repeating unit expressed by the general formula (2) and a monomer expressed by the general formula (1') are copolymerized in accordance with the method as disclosed in Japanese Unexamined Patent Application Laid-Open No. 2004-137444, for example, thereby to prepare a polyarylene having the sulfonic ester group, then the sulfonic ester group is de-esterified to convert it into a sulfonic acid group, and thereby a polyarylene having the sulfonic acid group is synthesized.

Method B

A monomer, having a skeleton expressed by the general formula (2) and having no sulfonic acid group or sulfonic ester group, and a monomer expressed by the general formula (1') are copolymerized in accordance with the method as disclosed in Japanese Unexamined Patent Application Laid-Open No. 2001-342241, for example, the resulting polymer is sulfonated by use of a sulfonating agent, thereby a polyarylene having the sulfonic acid group is synthesized.

Method C

In a case in which Ar is an aromatic group having a substituent expressed by —O(CH$_2$)$_p$SO$_3$H or —O(CF$_2$)$_p$SO$_3$H in the general formula (2), a precursor monomer capable of constituting the repeating unit expressed by the general formula (2) and a monomer expressed by the general formula (1') are copolymerized in accordance with the method as disclosed in Japanese Unexamined Patent Application Laid-Open No. 2005-60625, for example, then an alkylsulfonic acid or fluorinated alkylsulfonic acid is introduced to prepare a polyarylene.

Specific examples of monomers, utilized in Method A, capable of constituting the repeating unit of the sulfonic ester group expressed by the general formula (2), include the aromatic sulfonic esters described in Japanese Unexamined Patent Application Laid-Open Nos. 2004-137444, 2004-345997 and 2004-346163.

Specific examples of monomers, utilized in Method B, capable of constituting the repeating unit expressed by the general formula (2), and having no sulfonic acid group or sulfonic ester group, include the dihalogenated compounds described in Japanese Unexamined Patent Application Laid-Open Nos. 2001-342241 and 2002-293889.

Specific examples of precursor monomers, utilized in Method C, capable of constituting the repeating unit expressed by the general formula (2), include the dihalogenated compounds described in Japanese Unexamined Patent Application Laid-Open No.2005-36125, specifically: 2,5-dichloro-4'-hydroxybenzophenone, 2,4-dichloro-4'-hydroxybenzophenone, 2,6-dichloro-4'-hydroxybenzophenone, 2,5-dichloro-2', 4'-dihydroxybenzophenone, and 2, 4-dichloro-2',4'-dihydroxybenzophenone. The compounds of which the hydroxyl group is protected by tetrahydropyranyl group or the like may also be used. The compounds of which the hydroxyl group is replaced by a thiol group or of which the chlorine atom is replaced by a bromine or iodine atom may also be usable.

In polymerization conditions such as catalysts, contents of each component, and reaction solvent, concentration, temperature, and period, polyarylene may be synthesized.

Preferable transition metal salts include nickel chloride and nickel bromide. Preferable compounds for ligands include triphenylphosphine and 2,2'-bipyridine. Examples of transition metal (salt) with a coordinated ligand include nickel chloride bis(triphenylphosphine) and nickel chloride (2,2'-bipyridine). Examples of reducing agents include iron, zinc, manganese, aluminum, magnesium, sodium and potassium; preferable are zinc, magnesium and manganese. Preferable examples of the "salt" include sodium bromide, sodium iodide, potassium bromide, tetraethyl ammonium bromide and tetraethyl ammonium iodide. A solvent may be employed to promote the polymerization in the reaction; specific examples thereof include tetrahydrofuran, N,N-dimethylformamide, N,N-dimethylacetamide and 1-methyl-2-pyrrolidone.

The polyarylenes, constituted from the repeating units of the general formulas (1) and (2), having a sulfonic acid group may be prepared by converting a polyarylene as its precursor into the corresponding polyarylene having a sulfonic acid group. Such methods may be exemplified by the three methods described below.

In the case of Method A, the sulfonic ester group in the precursor polyarylene is de-esterified in accordance with the method as disclosed in Japanese Unexamined Patent Application Laid-Open No. 2004-137444.

In the case of Method B, sulfonic acid group is introduced into the precursor polyarylene in accordance with the method as disclosed in Japanese Unexamined Patent Application Laid-Open No. 2001-342241.

In the case of Method C, alkylsulfonic acid group is introduced into the precursor polyarylene in accordance with the method as disclosed in Japanese Unexamined Patent Application Laid-Open No. 2005-60625. In the C method, the introduction may be attained through reacting the hydroxyl group of the precursor polyarylene with propane sultone, butane sultone or the like.

The ion-exchange capacity of the polyarylenes having a sulfonic acid group prepared in accordance with the methods described above is usually 0.3 to 5 meq/g, preferably 0.5 to 3 meq/g, more preferably 0.8 to 2.8 meq/g. When the ion-exchange capacity is less than 0.3 meq/g, the power generating performance is insufficient due to lower proton conductivity. On the other hand, when it is more than 5 meq/g, the water resistance may be remarkably degraded.

The polyarylenes, constituted from the repeating units of general formulas (1) and (2), having the sulfonic acid group may provide the polymers with the effect of increasing the toughness of polymers and other mechanical strengths due to the flexible structure derived from the repeating unit expressed by the formula (1). In addition, even when the content of the sulfonic acid group is increased so as to enhance the ion-exchange capacity, the water resistance may be maintained due to the higher hydrophobic property.

The ion-exchange capacity may be controlled, for example, by selecting the types of the precursor monomer capable of constituting the repeating unit expressed by the general formula (2) and the monomer expressed by the general formula (1'), usage ratio, content of the introduced sulfonic acid group, and combination of sulfonic acid groups.

The molecular weight of the resulting polyarylene having the sulfonic acid group is 10,000 to 1,000,000, preferably 20,000 to 800,000 as the average molecular weight based on polystyrene standard by way of gel permeation chromatography (GPC).

Solid Polymer Electrolyte Membrane and Method for Producing the Same

The aromatic polymers, in particular copolymers having the sulfonic acid group, specifically those having the repeating units of (1) and (2) may be preferably utilized for producing solid polymer electrolyte membranes of proton conductive membranes. The solid polymer electrolyte membranes may be produced, for example, by way of solvent casting methods such as dissolving the copolymer and an optional additive into an organic solvent to prepare a composition, flowing the composition over a substrate, and forming into a film.

The substrate may be of any type as long as it is usable in common solvent casting methods, for example, those may be utilized for plastics, metals, and thermoplastic resins such as polyethylene terephthalate (PET) films.

The viscosity of the solution depends on the molecular weight of the polymer, concentration of the polymer and the like; the viscosity is typically 2,000 to 100,000 mPa·s, and preferably 3,000 to 50,000 mPa·s.

Examples of the solvents usable in the method for producing the membrane include aprotic polar solvents such as N-methyl-2-pyrrolidone, N,N-dimethylformamide, γ-butyrolactone, N,N-dimethylacetamide, dimethylsulfoxide, dimethylurea and dimethylimidazolizinone. Among these, N-methyl-2-pyrrolidone (hereinafter referred to sometimes as "NMP") is preferred in particular from the viewpoint of solubility and solution viscosity. These aprotic polar solvents may be used alone or in combination.

The solvent may be a mixture of the aprotic polar solvent described above and an alcohol. Examples of the alcohol include methanol, ethanol, propyl alcohol, isopropyl alcohol, sec-butyl alcohol and tert-butyl alcohol. Among these, methanol is preferred since it can reduce the viscosity in a wider composition range. These alcohols may be used alone or in combination thereof.

In addition to these alcohols, inorganic acids such as sulfuric acid and phosphoric acid, organic acids such as carboxylic acids or water may be incorporated together in a proper amount.

The concentration of the polymer in the solution for producing the membrane is typically 5 to 40 mass %, preferably 7 to 25 mass %. When the polymer concentration is less than 5 mass %, thicker membranes are difficult to obtain, and pinholes tend to occur. On the other hand, when the polymer concentration is more than 40 mass %, the solution viscosity is too high to form the films properly, and also the surface smoothness may be deteriorated.

The solution viscosity is typically 2,000 to 100,000 mPa·s, preferably 3,000 to 50,000 mPa·s. When the solution viscosity is less than 2,000 mPa·s, the retentivity of the solution is likely to be insufficient, thus the solution sometimes flows out of the substrate. On the other hand, when the solution viscosity is more than 100,000 mPa·s, the viscosity is too high for extruding the solution from dies, thus the films are difficult to form under flowing processes.

The resulting non-dried films are immersed in water after the films are produced, and thereby the organic solvent in the non-dried film can be replaced with water, and the residual solvent can be reduced within the solid polymer electrolyte membranes. The non-dried films may be pre-dried before immersing them in water. The pre-drying is typically carried out in conditions of 50 to 150 degrees C. for 0.1 to 10 hours.

When the non-dried films (hereinafter including "non-dried film after pre-drying") are immersed in water, the film pieces may be immersed in water in batches; alternatively, a continuous process may be carried out such that an intact laminate film is formed on a substrate film, e.g., PET or a membrane separated from the substrate is immersed in water and wound up successively. In the batch method, it is preferred that the non-dried films be fitted into frames and then immersed in water so as to prevent wrinkles on the surface of the films after the processing.

The amount of water utilized when immersing the non-dried films is 10 mass parts or more, preferably 30 mass parts or more, more preferably 50 parts or more based on one part of the non-dried films. When the amount of water is in this the range, the amount of solvent remaining may be reduced in the resulting solid polymer electrolyte membranes. Furthermore, the control of the concentration of organic solvents at or under a certain level, by the water for immersion being replaced or overflowed properly, for example, is effective to reduce the solvent that remains within the resulting solid polymer electrolyte membranes. Furthermore, the concentration of organic solvent in the water is effectively homogenized by way of stirring, for example, in order that the two-dimensional distribution of residual organic solvent be reduced within the solid polymer electrolyte membranes.

The temperature of the water, in which the non-dried films are immersed in water, is typically 5 to 80 degrees C., and preferably 10 to 60 degrees C. from the viewpoint of replacing rate and ease of handling. The higher the temperature, the higher the rate of replacement the organic solvent with water; however, the surface condition of the solid polymer electrolyte membranes may be deteriorated after drying since the amount of water absorbed into the films tend to increase with the increasing temperature. The immersing period of films depends on the initial content of residual solvent, amount of water used, and processing temperature; the period is typically 10 minutes to 240 hours, preferably 30 minutes to 100 hours.

After immersing the non-dried films into water as described above, the films are dried at 30 to 100 degrees C., preferably at 50 to 80 degrees C. for 10 to 180 minutes, preferably for 15 to 60 minutes, then are dried at 50 to 150 degrees C., preferably under reduced pressure of 500 mmHg to 0.1 mmHg for 0.5 to 24 hours, and thereby solid polymer electrolyte membranes may be obtained.

In the resulting solid polymer electrolyte membranes, the content of the residual solvent is typically reduced to 5 mass % or less, preferably to 1 mass % or less.

The thickness of the resulting solid polymer electrolyte membranes is typically 10 to 100 pm, preferably 20 to 80 um in the dried condition, the thickness can be controlled by adjusting the thickness of the substrate or frame shape.

Membrane-Electrode Assemblies for Solid Polymer Electrolyte Fuel Cell

The membrane-electrode assemblies according to the present invention utilized for solid polymer electrolyte fuel cells may be obtained by providing an anode electrode layer on one side and a cathode electrode layer on the other side of the solid polymer electrolyte membrane.

The catalyst on electrodes in the present invention is preferably a supported catalyst in which platinum or platinum alloy is supported on a porous carbon material. Carbon blacks or activated carbons may be utilized for the porous carbon material. Examples of the carbon blacks include channel blacks, furnace blacks, thermal blacks, and acetylene blacks; the activated carbons may be those produced through carbonizing and activating various carbon-containing materials.

Catalysts formed by supporting platinum or a platinum alloy on a carbon carrier may be utilized; platinum alloys may afford stability and activity to electrode catalysts. Preferably, platinum alloys are preferred which are formed from platinum and at least a metal selected from platinum group metals other than platinum (i.e., ruthenium, rhodium, palladium, osmium or iridium), or metals of other groups such as cobalt, iron, titanium, gold, silver, chrome, manganese, molybdenum, tungsten, aluminum, silicon, rhenium, zinc or tin; the platinum alloys may include an intermetallic compound which is formed of platinum and another metal alloyable with platinum.

Preferably, the supported content of platinum or platinum alloy (i.e., mass % of platinum or platinum alloy on the basis of the entire mass of the catalyst) is 20 to 80 mass %, in particular 30 to 60 mass %, since the range may afford higher output power. When the supported content is less than 20 mass %, sufficient output power may possibly not be attained, when over 80 mass %, the particles of platinum or platinum alloy may not be supported on the carrier of carbon material with sufficient dispersability.

The primary particle size of the platinum or platinum alloy is preferably 1 to 20 nm so as to attain highly active gas diffusion electrodes; in particular, the primary particle size is preferably 2 to 5 nm to ensure larger surface area of platinum or platinum alloy from the viewpoint of reaction activity.

The catalyst layers in the present invention include, in addition to the supported catalyst, an ion conductive polymer electrolyte or ion conductive binder that contains a sulfonic group. Usually, the supported catalysts are covered with the electrolyte, thus protons (H+) travel through the pathway of the connecting electrolyte.

Perfluorocarbon polymers represented by Nafion, Flemion and Aciplex are appropriately utilized for the ion conductive polymer electrolyte containing a sulfonic acid group. Ion conductive polymer electrolytes based on the aromatic hydrocarbon compounds such as sulfonated polyarylenes described in this specification may be utilized in place of the perfluorocarbon polymers.

Preferably, the ion conductive binder is included in a mass ratio of 0.1 to 3.0, preferably 0.3 to 2.0 in particular based on the mass of catalyst particles. When the ratio of the ion conductive binder is less than 0.1, protons may not be conducted into the electrolyte, thus resulting possibly in insufficient power output; when the ratio is more than 3.0, the ion conductive binder may cover the catalyst particles completely, and thus gas cannot reach the platinum, possibly resulting in insufficient power output.

The method for forming the catalyst layer may be based on well-known methods such as: the supported catalyst and perfluorocarbon polymer having a sulfonic acid group dispersed in a dispersion medium to prepare a dispersion, optionally, a water repellent agent, pore-forming agent, thickener, diluent solvent and the like are added to the dispersion, then the dispersion is sprayed, coated or filtered on an ion-exchange membrane, gas-diffusionlayerorflatplate. Inthecaseinwhichthecatalyst layer is not formed on the ion-exchange layer directly, the catalyst layer and the ion-exchange layer are preferably connected by way of a hot-press or adhesion process (see Japanese Unexamined Patent Application Laid-Open No. Hei 07-220741, etc.).

The assemblies of solid polymer electrolyte membranes and electrodes according to the present invention may be formed solely of an anodic catalyst layer, a solid polymer electrolyte membrane, and a cathodic catalyst layer; more preferably, a gas diffusion layer formed of conductive porous material such as carbon paper and carbon cloth is disposed outside the catalyst layer along with the anode and cathode. The gas diffusion layer may act as an electric collector; therefore, the combination of the gas diffusion layer and the catalyst layer is referred to as an "electrode" in this specification when the gas diffusion layer is provided.

The method for producing the assemblies of solid polymer electrolyte membranes and electrodes may be selected from various methods such as: a catalyst layer is formed directly on an ion-exchange membrane and is sandwiched with a gas diffusion layer as required; a catalyst layer is formed on a substrate for a gas diffusion layer such as carbon paper, and then the catalyst layer is connected with an ion-exchange membrane; a catalyst layer is formed on a flat plate, the catalyst layer is transferred onto an ion-exchange membrane, then the flat plate is peeled away, and sandwiched with a gas diffusion layer as required.

In the solid polymer electrolyte fuel cells equipped with the assemblies of solid polymer electrolyte membranes and electrodes according to the present invention, oxygen-containing gas is supplied to the cathode and hydrogen-containing gas is supplied to the anode. Specifically, separators having channels for gas passage are disposed outside the two electrodes of the assembly of solid polymer electrolyte membrane and electrode, gas is flowed into the passage, and thereby the gas for fuel is supplied to the assembly of solid polymer electrolyte membrane and electrode.

EXAMPLES

The present invention will be explained more specifically with reference to examples, which are not intended to limit the scope of the present invention. The methods or ways to determine various measurements in the examples are also illustrated in the following.

Molecular Weight

Molecular weight of polymers was determined by gel permeation chromatography (GPC) as the molecular weight based on polystyrene standard. The solvent was N-methyl-2-pyrrolidone to which lithium bromide was added.

Ion-Exchange Capacity

The resulting sulfonated polymers were washed with distilled water until the washing water became neutral so as to remove free residual acid, and they were then dried. The polymers were then weighed in a predetermined amount, dissolved into a mixed solvent of THF/water, titrated with a NaOH standard solution. Ion-exchange capacity was determined from the neutralization point in terms of the equivalent of sulfonic acid group (meq/g).

Evaluation of Hot Water Resistance

The resulting solid polymer electrolyte membranes according to the present invention were evaluated by immersing them in hot water at 120 degrees C. After the immersion, the membranes were evaluated and ranked as follows:

Satisfactory: configuration of membrane could be maintained after the immersion

Unsatisfactory: configuration of membrane could not be maintained after the immersion Evaluation of Power Generating Property MEAs according to the present invention were evaluated with respect to cell stability as follows: electric power was generated for 100 hours by use of MEA at 95 degrees C., relative humidity 10%/50% on fuel electrode side/oxygen electrode side, and current density 1 A/cm$^2$, and then cell potential was measured at 70 degrees C., relative humidity 70%/70% on fuel electrode side/oxygen electrode side, and current density 1 A/cm$^2$. Pure hydrogen was supplied to the fuel electrode side and air was supplied to the oxygen electrode side.

Example 1

Preparation of Solid Polymer Electrolyte Membrane

Into a 1 L three-necked flask equipped with a stirrer, thermometer, Dean-Stark apparatus, nitrogen inlet, and cooling pipe were weighed 20.0 g (57 mmol) of 9,9-bisphenolfluorene, 43.1 g (171 mmol) of 2,4'-dichlorobenzophenone and 10.3 g (74 mmol) of potassium carbonate. After exchanged with nitrogen gas, 243 ml of sulfolane and 121 ml of toluene were added and stirred. The reaction liquid was heated to 130 degrees C. and refluxed by use of an oil bath. Water generated through the reaction was trapped in the Dean-Stark apparatus. When water generation became near zero after three hours, toluene was removed from the Dean-Stark apparatus. The reaction temperature was gradually raised to 200 degrees C., stirring was continued for 15 hours, 43.1 g (171 mmol) of 2,4'-dichlorobenzophenone was added and allowed further to react for 8 hours.

The reaction liquid was allowed to cool and then diluted by adding 100 ml of toluene. Inorganic salts insoluble in the reaction liquid were filtered, then the filtrate was poured into 2 L of methanol to cause precipitation. The precipitated product was filtered, dried, then dissolved in 250 ml of tetrahydrofuran, then the solution was poured into 2 L of methanol to cause re-precipitation. The precipitated white powder was filtered and dried, thereby 41 g of intended product was obtained. The resulting product was confirmed to be the compound expressed by the formula (11).

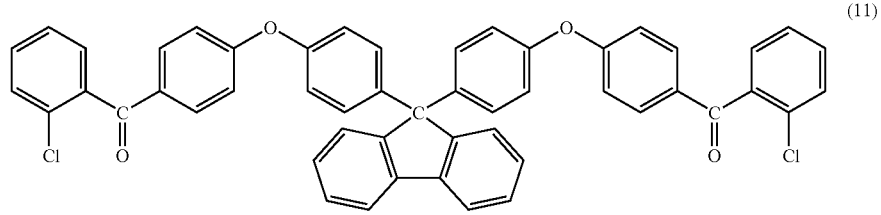

(11)

Into a 3 L three-necked flask equipped with a stirrer, thermometer, and nitrogen inlet, were weighed and added 97.5 g (125 mmol) of the compound expressed by the formula (11), 150.5 g (375 mmol) of 3-(2,5-dichlorobenzoyl)benzenesulfonic acid neopentyl, 9.81 g (15 mmol) of bis(triphenylphosphine)nickeldichloride, 2.3 g (15 mmol) of sodium iodide, 52.5 g (200mmol) of triphenylphosphine and 78.4 g (1200 mmol) of zinc were weighed, then exchange with nitrogen gas was conducted. To the mixture was added 580 ml of N,N-dimethylacetamide (DMAc), the mixture was then stirred for 3 hours while keeping the temperature at 80 degrees C., then the reaction mixture was diluted with 600 ml of DMAc and insoluble matter was filtered.

The resulting filtrate was poured into a 3 L three-necked flask equipped with a stirrer, thermometer and nitrogen inlet, heated and stirred at 115 degrees C., to which 71.7 g (830 mmol) of lithium bromide was added. The mixture was poured into 5 L of acetone after stirring for 7 hours, and thereby the product was precipitated. The product was then washed with 1N HCl and pure water, in that order, and dried to obtain 178 g of the desired sulfonated polymer. The weight average molecular weight of the polymer was about 80,000, which was estimated as the sulfonated polymer expressed by the formula (12). The ion-exchange capacity of the polymer was 1.9 meq/g.

described above was coated by use of a bar coater in an amount so that the platinum content was 0.5 mg/cm$^2$, and was dried to prepare an electrode-coating membrane (CCM). In the drying step, a first drying at 100 degrees C. for 15 minutes was followed by a secondary drying at 140 degrees C. for 10 minutes.

iv) Preparation of MEA

An MEA was prepared by the way that the CCM was gripped with the side of underlying layer of the gas diffusion layer, then subjected to hot-pressing. In the hot-pressing step, a first hot-pressing at 80 degrees C. and 5 MPa for 2 minutes was followed by a second hot-pressing at 160 degrees C. and 4 MPa for 1 minute.

In addition, a solid polymer electrolyte fuel cell may be constructed so that a separator, being also a gas passage, is laminated on the gas diffusion layer.

(12)

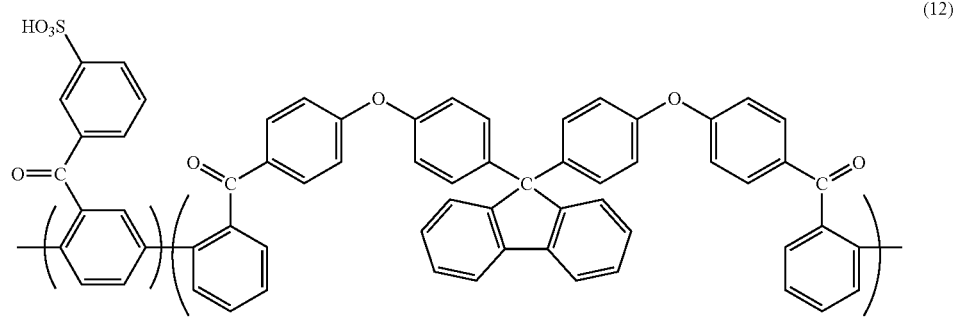

The polymer was dissolved into N-methylpyrrolidone, then a film having a thickness of 40 pm was prepared through a casting process.

Preparation of MEA i) Catalyst Paste

Platinum particles were supported on a carbon black of furnace black having an average particle size of 50 nm in a mass ratio 1:1 of carbon black:platinum thereby preparing catalyst particles. The catalyst particles were dispersed uniformly into a solution of perfluoroalkylene sulfonic acid polymer compound (Nafion (product name), by DuPont) as an ion conductive binder in a mass ratio 8:5 of ion conductive binder:catalyst particles thereby preparing a catalyst paste.

ii) Gas Diffusion Layer

The carbon black and polytetrafluoroethylene (PTFE) particles were mixed in a mass ratio 4:6 of carbon black:PTFE particles, the resulting mixture was dispersed uniformly into ethylene glycol to prepare a slurry, then the slurry was coated and dried on one side of a carbon paper to form an underlying layer, and thereby two gas diffusion layers were prepared that were formed of the underlying layer and the carbon paper.

iii) Preparation of Electrode-Coating Membrane (CCM)

To both sides of the solid polymer electrolyte membrane, prepared in the example described above, the catalyst paste Example 2

Preparation of Solid Polymer Electrolyte Membrane

Into a 1 L three-necked flask equipped with a stirrer, thermometer, Dean-Starkapparatus, nitrogeninlet, andcoolingpipe were weighed and added 21.6 g (57 mmol) of 9,9-biscresolfluorene, 43.1 g (171 mmol) of 4,4'-dichlorobenzophenone and 10.3 g (74 mmol) of potassium carbonate. After purging with nitrogen gas, 243 ml of sulfolane and 121 ml of toluene were added and stirred. The reaction liquid was heated to 130 degrees C. and refluxed by use of an oil bath. Water generated through the reaction was trapped in the Dean-Stark apparatus. When water generation became nearly zero after three hours, toluene was removed from the Dean-Stark apparatus. The reaction temperature was gradually raised to 200 degrees C., stirring was continued for 15 hours, 43.1 g (171 mmol) of 4,4'-dichlorobenzophenone was added and allowed to further react for 8 hours.

The reaction liquid was allowed to cool and then diluted by adding 100 ml of toluene. Inorganic salts insoluble into the reaction liquid were filtered, then the filtrate was poured into 2 L of methanol to cause precipitation. The precipitated product was filtered, dried, then dissolved in 250 ml of tetrahydrofuran, then the solution was poured into 2 L of methanol to cause re-precipitation. The precipitated powder was filtered and dried, and thereby 44 g of desired product was obtained. The resulting product was confirmed to be the compound expressed by the formula (13).

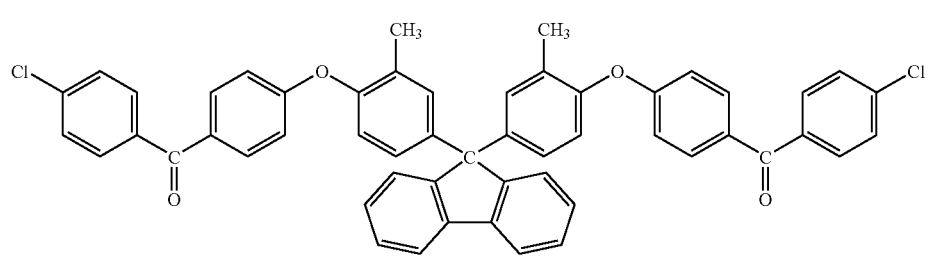

(13)

Into a 3 L three-necked flask equipped with a stirrer, thermometer and nitrogen inlet were weighed 101.0 g (125 mmol) of the compound expressed by the formula (13), 150.5 g (375 mmol) of 3-(2,5-dichlorobenzoyl)benzenesulfonic acid neopentyl, 9.81 g (15 mmol) of bis(triphenylphosphine)nickeldichloride, 2.3 g (15 mmol) of sodium iodide, 52.5 g (200 mmol) of triphenylphosphine and 78.4 g (1200 mmol) of zinc were weighed, then exchanged with nitrogen gas was conducted. To the mixture was added 580 ml of N,N-dimethylacetamide (DMAc), the mixture was then stirred for 3 hours while keeping the temperature at 80 degrees C., then the reaction mixture was diluted with 600 ml of DMAc and insoluble matter was filtered out.

The resulting filtrate was poured into a 3 L three-necked flask equipped with a stirrer, thermometer and nitrogen inlet, heated and stirred at 115 degrees C., to which 71.7 g (830 mmol) of lithium bromide was added. The mixture was poured into 5 L of acetone after stirring for 7 hours, and thereby the product was precipitated. The product was then washed with 1N HCl and pure water, in that order, and was dried to obtain 177 g of desired sulfonated polymer. The weight average molecular weight of the polymer was about 76,000, which was estimated as the sulfonated polymer expressed by the formula (14). The ion-exchange capacity of the polymer was 1.9 meq/g.

Preparation of MEA

An MEA was prepared in the same manner as Example 1 except that the solid polymer electrolyte membrane was replaced with that prepared in Example 2.

Example 3

Preparation of Solid Polymer Electrolyte Membrane

Into a 1 L three-necked flask equipped with a stirrer, thermometer, Dean-Stark apparatus, nitrogen inlet, and cooling pipe were weighed and added 28.7 g (57 mmol) of 9,9-bis(2-phenylphenol)fluorene, 40.2 g (171 mmol) of 4-chloro-4'-fluorobenzophenone and 10.3 g (74 mmol) of potassium carbonate. After purging with nitrogen gas, 243 ml of sulfolane and 121 ml of toluene were added and stirred. The reaction liquid was heated to 130 degrees C. and refluxed by use of an oil bath. Water generated through the reaction was trapped in the Dean-Stark apparatus. When water generation became nearly zero after three hours, toluene was removed from the Dean-Stark apparatus. The reaction temperature was gradually raised to 200 degrees C., stirring was continued for 15 hours, 40.2 g (171 mmol) of 4-chloro-4'-fluorobenzophenone was added and allowed further to react for 8 hours.

The reaction liquid was allowed to cool and then diluted by adding 100 ml of toluene. Inorganic salts insoluble in the reaction liquid were filtered, then the filtrate was poured into 2 L of methanol to cause precipitation. The precipitated product was filtered, dried, then dissolved into 250 ml of tetrahydrofuran, then the solution was poured into 2 L of methanol to cause re-precipitation. The precipitated powder was filtered

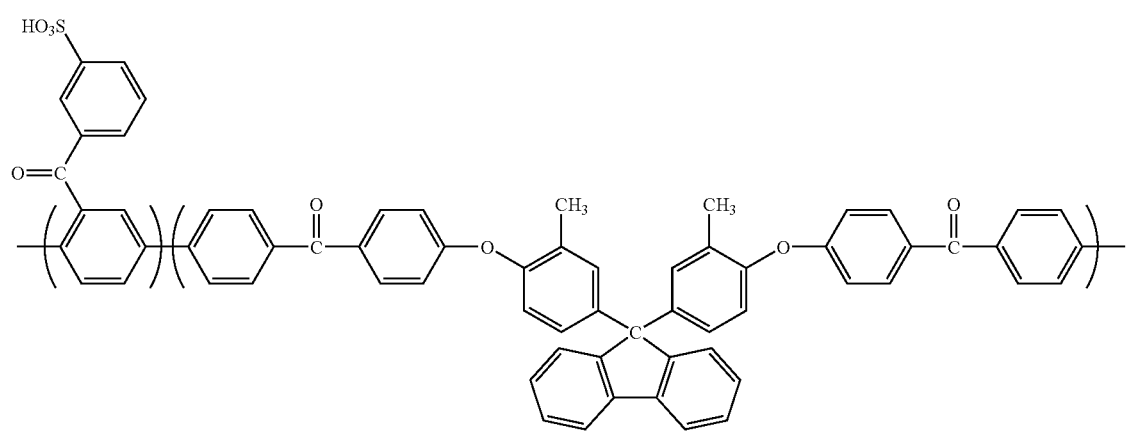

(14)

The polymer was dissolved into N-methylpyrrolidone, then a film having a thickness of 40 μm was prepared through a casting process.

and dried, and thereby 51 g of desired product was obtained. The resulting product was confirmed to be the compound expressed by the formula (15).

The polymer was dissolved into N-methylpyrrolidone, then a film having a thickness of 40 μm was prepared through a casting process.

(15)

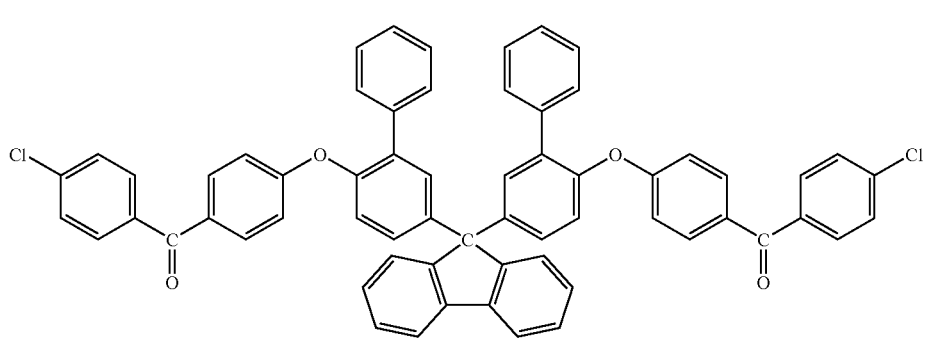

Into a 3 L three-necked flask equipped with a stirrer, thermometer and nitrogen inlet were weighed and added 116.5 g (125 mmol) of the compound expressed by the formula (15), 150.5 g (375 mmol) of 3-(2,5-dichlorobenzoyl)benzenesulfonic acid neopentyl, 9.81 g (15 mmol) of bis(triphenylphosphine)nickeldichloride, 2.3 g (15mmol) of sodium iodide, 52.5 g (200mmol) of triphenylphosphine and 78.4 g (1200 mmol) of zinc were weighed, then purging with nitrogen gas was conducted. To the mixture was added 580 ml of N,N-dimethylacetamide (DMAc), the mixture was then stirred for 3 hours while keeping the temperature at 80 degrees C., and then the reaction mixture was diluted with 600 ml of DMAC and insoluble matter was filtered out.

The resulting filtrate was poured into a 3 L three-necked flask equipped with a stirrer, thermometer, and nitrogen inlet, and was heated and stirred at 115 degrees C., to which 71.7 g (830 mmol) of lithium bromide was added. The mixture was poured into 5 L of acetone after stirring for 7 hours, and thereby the product was precipitated. The product was then washed with 1N HCl and pure water, in that order, and was dried to obtain 197 g of desired sulfonated polymer. The weight average molecular weight of the polymer was about 83,000, which was estimated to be the sulfonated polymer expressed by the formula (16). The ion-exchange capacity of the polymer was 1.8 meq/g.

Preparation of MEA

An MEA was prepared in the same manner as Example 1 except that the solid polymer electrolyte membrane was replaced with that prepared in Example 3.

Comparative Example 1

Preparation of Solid Polymer Electrolyte Membrane

Into a 1 L three-necked flask equipped with a stirrer, thermometer, Dean-Stark apparatus, nitrogen inlet, and cooling pipe were weighed and added 11.4 g (57 mmol) of bis(4-hydroxyphenyl)methane, 43.1 g (171 mmol) of 2,4'-dichlorobenzophenone and 10.3 g (74 mmol) of potassium carbonate. After purging with nitrogen gas, 243 ml of sulfolane and 121 ml of toluene were added and stirred. The reaction liquid was heated to 130 degrees C. and refluxed by use of an oil bath. Water generated through the reaction was trapped in the Dean-Stark apparatus. When water generation became nearly zero after three hours, toluene was removed from the Dean-Stark apparatus. The reaction temperature was gradually raised to 200 degrees C., stirring was continued for 15 hours, 43.1 g (171 mmol) of 2,4'-dichlorobenzophenone was added and allowed further to react for 8 hours.

The reaction liquid was allowed to cool and was then diluted by adding 100 ml of toluene. Inorganic salts insoluble (16)

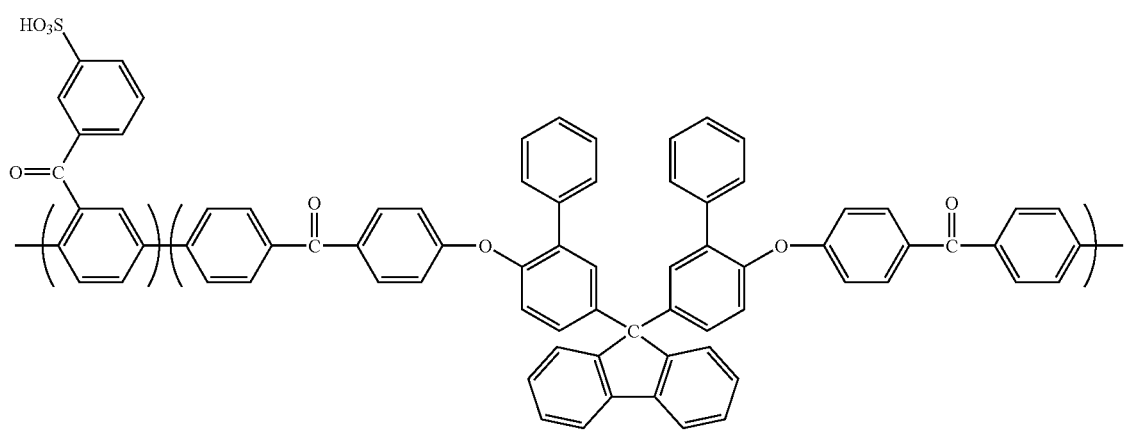

into the reaction liquid were filtered, then the filtrate was poured into 2 L of methanol to cause precipitation. The precipitated product was filtered, dried, then dissolved into 250 ml of tetrahydrofuran, then the solution was poured into 2 L of methanol to cause re-precipitation. The precipitated powder was filtered and dried, and thereby 32 g of desired product was obtained. The resulting product was confirmed to be the compound expressed by the formula (17).

Preparation of MEA

An MEA was prepared in the same manner as Example 1 except that the solid polymer electrolyte membrane was replaced with that prepared in Comparative Example 1.

MEAs prepared in Examples 1 to 3 and Comparative Example 1 were evaluated with respect to hot water resistance and power generating performance in accordance with the procedures described above. The results are summarized in

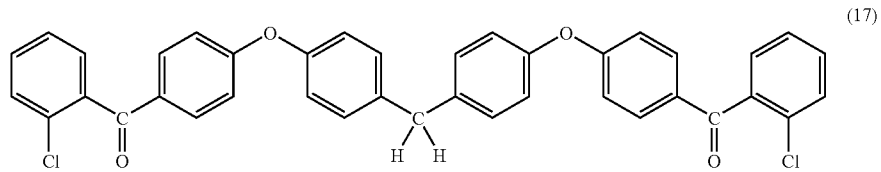

(17)

Into a 3 L three-necked flask equipped with a stirrer, thermometer and nitrogen inlet were weighed and added 78.7 g (125 mmol) of the compound expressed by the formula (17), 150.5 g (375 mmol) of 3-(2,5-dichlorobenzoyl)benzenesulfonic acid neopentyl, 9.81 g (15 mmol) of bis(triphenylphosphine)nickeldichloride, 2.3 g (15 mmol) of sodium iodide, 52.5 g (200 mmol) of triphenylphosphine and 78.4 g (1200 mmol) of zinc were weighed, then purging with nitrogen gas was conducted. To the mixture was added 580 ml of N,N-dimethylacetamide (DMAc), the mixture was then stirred for 3 hours while keeping the temperature at 80 degrees C., then the reaction mixture was diluted with 600 ml of DMAc and insoluble matter was filtered.

The resulting filtrate was poured into a 3 L three-necked flask equipped with a stirrer, thermometer and nitrogen inlet, heated and stirred at 115 degrees C., to which 71.7 g (830 mmol) of lithium bromide was added. The mixture was poured into 5 L of acetone after stirring for 7 hours, and thereby the product was precipitated. The product was then washed with 1N HCl and pure water, in that order, and was dried to obtain 161 g of desired sulfonated polymer. The weight average molecular weight of the polymer was about 74,000, which was estimated to be the sulfonated polymer expressed by the formula (18). The ion-exchange capacity of the polymer was 1.9 meq/g.

Table 1. Power Generating Property at Comparative Example 1 indicates that no data was obtainable since the test was stopped before 100 hours since a cross leak occurred due to breakage of the membrane.

TABLE 1

| | Ion-Exchange Capacity (meq/g) | Hot Water Resistance | Power Generating Property (V) |
|---|---|---|---|
| Example 1 | 1.9 | Satisfactory | 0.623 |
| Example 2 | 1.9 | Satisfactory | 0.621 |
| Example 3 | 1.8 | Satisfactory | 0.618 |
| Comparative Example 1 | 1.9 | Unsatisfactory | no data obtainable |

The results of Table 1 show that introduction of aromatic units having a fluorene skeleton within the principal chain may improve the hot water resistance, and consequently, MEAs may be obtained with superior power generating performance and durability.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention.

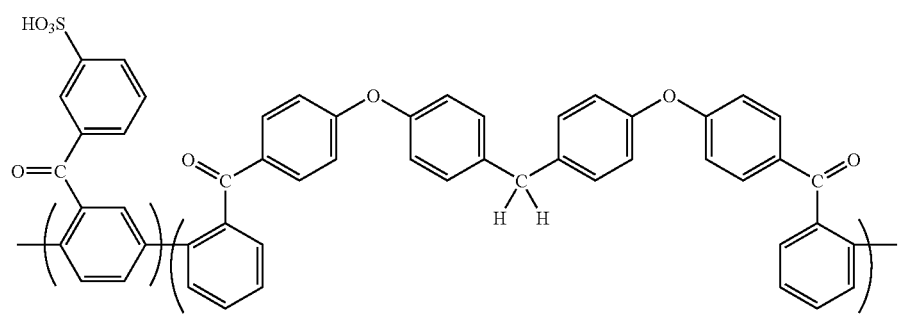

(18)

The polymer was dissolved into N-methylpyrrolidone, then a film having a thickness of 40 μm was prepared through a casting process.

Accordingly, the invention is not to be considered to be limited by the foregoing description and is only limited by the scope of the appended claims.

What is claimed is:

1. A membrane-electrode assembly for solid polymer electrolyte fuel cells, comprising:
   an anode electrode,
   a cathode electrode, and
   a solid polymer electrolyte membrane;
   the anode electrode disposed on one side of the solid polymer electrolyte membrane, and
   the cathode electrode disposed on an opposite side of the solid polymer electrolyte membrane,
   wherein the solid polymer electrolyte membrane contains an aromatic polymer having a repeating unit expressed by the general formula (1) shown below:

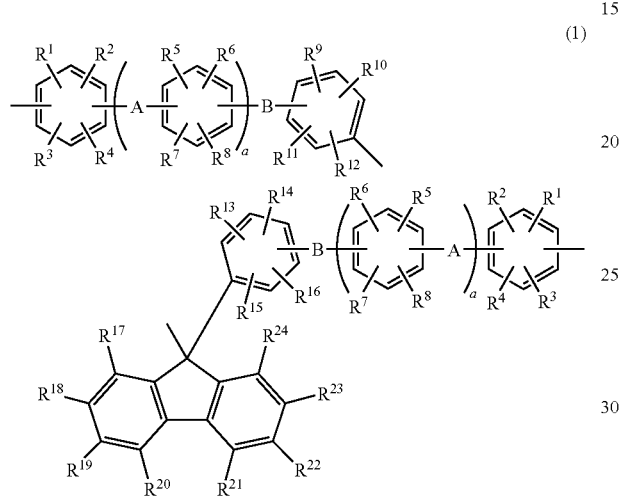

in which A represents —CO—; B represents an oxygen atom; $R^1$ to $R^8$, $R^{10}$—$R^{13}$ and $R^{15}$—$R^{24}$ represent a hydrogen atom 'a' represents an integer of 0 to 4; and $R^9$ and $R^{14}$ are identical and represent an alkyl group or a phenyl group.

2. A membrane-electrode assembly for solid polymer electrolyte fuel cells according to claim 1, wherein the aromatic polymer further comprises the repeating unit expressed by the general formula (2) shown below:

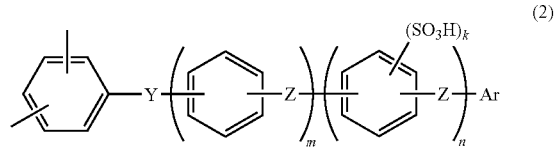

in which Y represents at least a structure selected from the group consisting of —CO—, —$SO_2$—, —SO—, —CONH—, —COO—, —$(CF_2)_l$— ('l' is an integer of 1 to 10) and —$C(CF_3)_2$—; Z represents a direct bond or at least a structure selected from the group consisting of —$(CH_2)_l$— ('l' is an integer of 1 to 10), —$C(CH_3)_2$—, —O — and —S—; Ar represents an aromatic group having a substituent expressed by —$SO_3H$, —$O(CH_2)_p SO_3H$ or —$O(CF_2)_p SO_3H$; p is an integer of 1 to 12, m is an integer of 0 to 10, n is an integer of 0 to 10, and k is an integer of 1 to 4.

3. A membrane-electrode assembly for solid polymer electrolyte fuel cells, comprising:
   an anode electrode,
   a cathode electrode, and
   a solid polymer electrolyte membrane;
   the anode electrode disposed on one side of the solid polymer electrolyte membrane, and
   the cathode electrode disposed on an opposite side of the solid polymer electrolyte membrane,
   wherein the solid polymer electrolyte membrane contains a sulfonated polymer having a repeating unit expressed by the general formula (14) shown below:

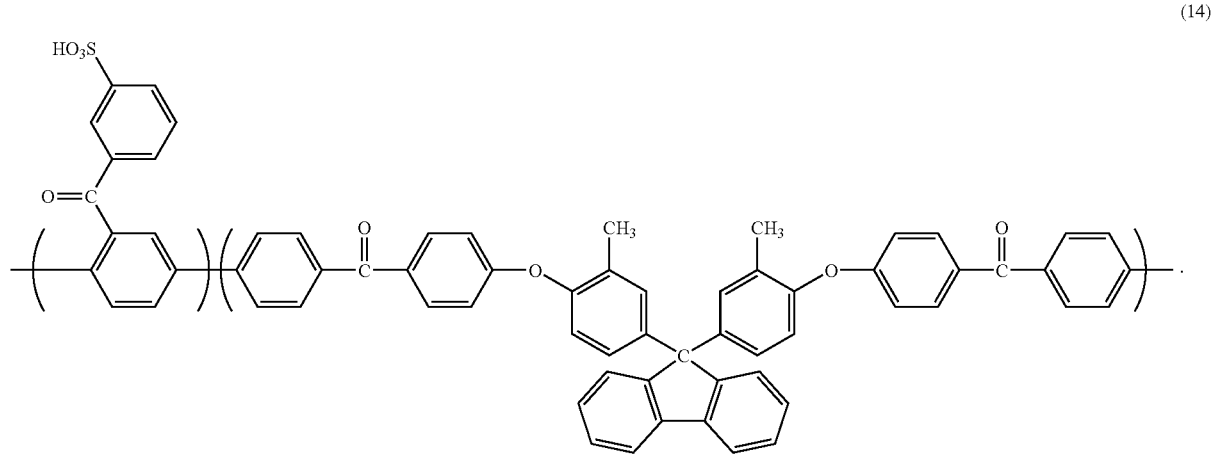

4. A membrane-electrode assembly for solid polymer electrolyte fuel cells, comprising:
   an anode electrode,
   a cathode electrode, and
   a solid polymer electrolyte membrane;
   the anode electrode disposed on one side of the solid polymer electrolyte membrane, and
   the cathode electrode disposed on an opposite side of the solid polymer electrolyte membrane, wherein the solid polymer electrolyte membrane contains a sulfonated polymer having a repeating unit expressed by the general formula (16) shown below:
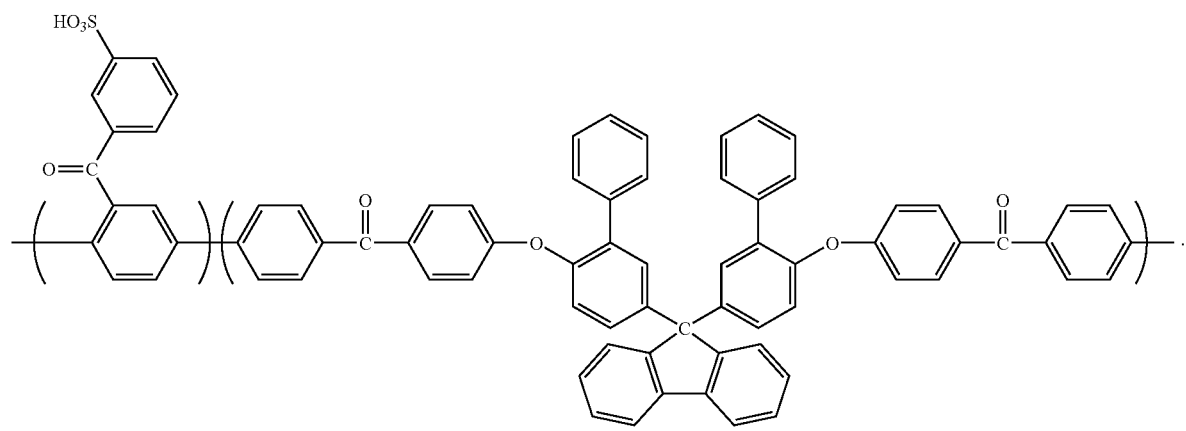
(16)
* * * * *